No. 669,285. Patented Mar. 5, 1901.
P. RAETZ.
FLOUR BIN AND SIFTER.
(Application filed May 5, 1900.)
(No Model.)
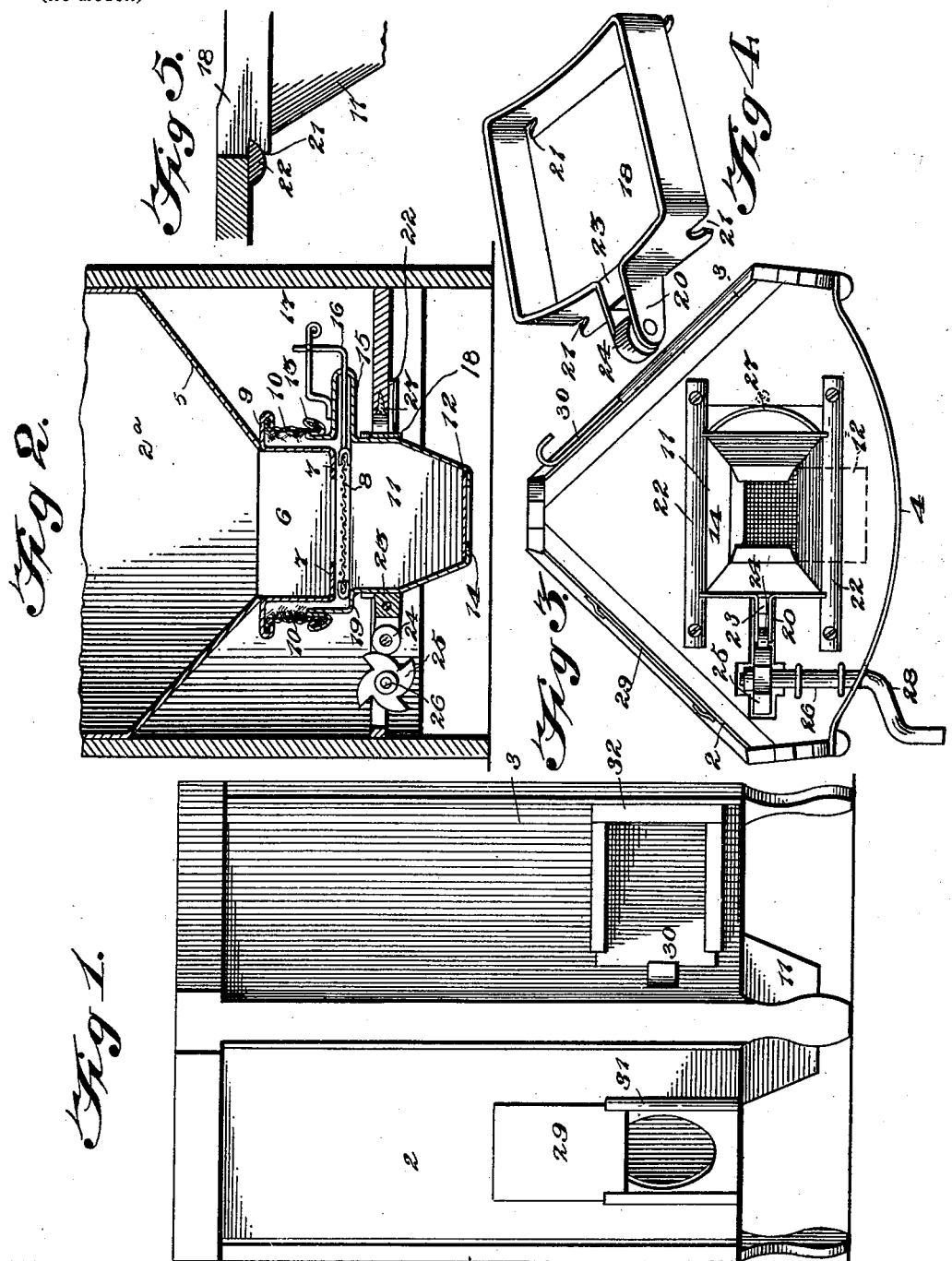
Witnesses
John Maupin.
H. F. Riley
P. Raetz Inventor
By C. A. Snow & Co. Attorneys,

UNITED STATES PATENT OFFICE.

PETER RAETZ, OF RACINE, WISCONSIN.

FLOUR BIN AND SIFTER.

SPECIFICATION forming part of Letters Patent No. 669,285, dated March 5, 1901.

Application filed May 5, 1900. Serial No. 15,617. (No model.)

*To all whom it may concern:*

Be it known that I, PETER RAETZ, a citizen of the United States, residing at Racine, in the county of Racine and State of Wisconsin, have invented a new and useful Flour Bin and Sifter, of which the following is a specification.

The invention relates to improvements of flour bins and sifters.

One object of the present invention is to improve the construction of flour bins and sifters and to provide a simple and comparatively inexpensive device capable of enabling flour and similar material to be quickly sifted without grinding it through the sieve and without permitting dust to escape at the point of sifting.

A further object of the invention is to enable the impurities separated by the sieve to be readily removed from the bin.

The invention consists in the construction and novel combination and arrangement of parts hereinafter fully described, illustrated in the accompanying drawings, and pointed out in the claims hereto appended.

In the drawings, Figure 1 is a rear elevation of a flour bin and sifter constructed in accordance with this invention. Fig. 2 is a vertical sectional view of the same. Fig. 3 is a bottom plan view. Fig. 4 is a detail perspective view of the sliding frame. Fig. 5 is a detail sectional view illustrating the manner of mounting the sliding frame.

Like numerals of reference designate corresponding parts in all the figures of the drawings.

1 designates a casing approximately quadrant-shaped in horizontal section and composed of sides 2 and 3, arranged at an angle to each other, and a curved front 4; but the casing, which is designed to be placed in a corner, may be of any other desired construction. The casing is provided with a bin 2ª, and it has a suitable cover (not shown) for the same. The bottom 5 of the bin 2ª is tapered or inclined toward the center, where it is provided with a depending rectangular neck 6, having a horizontal flange 7 at its lower end. The horizontal flange 7, which is located above a reciprocating sieve 8, is adapted when the sieve is reciprocated to assist in forcing flour through the same, and the said flange 7 is of sufficient width to permit the sieve to be reciprocated without the edge of the sieve being carried beyond the edge of the flange.

The depending rectangular neck 6 is provided at its top with a suitable flange 9, which is bent upon itself to secure the upper edge of a flexible sleeve 10 to the bin, and the said flange 9 may be bent or folded in any suitable manner to effect the attachment of the top of the sleeve to the bin. The flexible sleeve, which is constructed of canvas or other suitable material to prevent the escape of dust, is connected at its lower end to a reciprocating spout 11, which extends through the bottom of the casing, as clearly shown in Fig. 2, and which is provided at its lower end with a suitable cut-off 12. The upper edge of the spout is provided with a flange 13, which is bent around the bottom of the flexible sleeve, whereby the latter is secured to the spout. The cut-off 12 is supported upon a suitable inwardly-extending flange 14 and is adapted to be drawn outward through a slot or opening at the front of the spout.

The spout is provided at its sides with a horizontal ledge 19, formed by offsetting and enlarging the upper portion of the spout and serving as a support for the reciprocating sieve, which is located immediately below the flange 7. The sieve, which is reciprocated with the spout to carry it back and forth across the lower end of the neck 6 to sift the flour or other material, is adapted to be drawn outward into a horizontal extension or guide 15 of the spout to permit any impurities separated by it to be removed from the bin. The sieve is provided with an L-shaped arm 16, extending outward through the guide or extension 15 and upward, as clearly shown in Fig. 2. The sieve is retained in position for use by a resilient catch 17, mounted upon the guide or extension 15 and provided with a perforation for the reception of the upturned portion of the arm 16. The catch is adapted to be readily swung upward out of engagement with the upturned portion of the arm 16 to enable the sieve to be drawn outward into the horizontal extension or guide 15 of the spout. The horizontal guide or extension 15 of the spout may be constructed in any suitable manner, and it is substantially U-shaped in vertical section, as shown in Fig. 2.

The reciprocating spout is arranged within a rectangular sliding frame 18, preferably constructed of a single piece of metal, which has its terminals bent outward to form a pair of arms 20 at the center of one side or end of the frame. The frame is provided at opposite sides with notches 21, as illustrated in Fig. 4, and engages a pair of guide-bars 22, secured to the bottom of the casing, as clearly shown in Fig. 3, and projecting beyond an opening thereof. The arms 20 are spaced apart by a block 23 to receive an antifriction-roller 24, which is engaged by a cam-wheel 25, whereby the spout is reciprocated. The cam-wheel, which is mounted on a shaft 26, is provided with a series of teeth or cams arranged to move the spout in one direction, as illustrated in Fig. 2, and the spout is moved in the opposite direction by means of a bowed spring 27, arranged in the opening of the bottom of the casing and interposed between the latter and the adjacent side of the spout. The spring is centrally secured to the bottom of the casing, and its ends, which are free, engage the spout. The shaft 26, which carries the cam-wheel, is journaled in suitable bearings, and its outer portion, which extends from the front of the casing, is bent to form a crank-handle 28 for operating the sifter.

The casing is provided at its sides 2 and 3 with doors 29 and 30, mounted in suitable ways 31 and 32, arranged, respectively, in a vertical and in a horizontal position.

It will be seen that the device is exceedingly simple and inexpensive in construction, that it is easily operated, that the spring and the cam-wheel cause the sieve to be reciprocated with a jerky motion, and that the horizontal flanges at the lower end of the depending neck or portion of the bin assist in forcing the flour through the sieve. It will also be apparent that the impurities may be conveniently removed, the doors at the sides 2 and 3 of the casing affording access to the interior of the same, so that the sieve may be readily drawn outward into the extension of the spout.

Instead of employing the cam-lever and a spring for actuating the spout and the sieve a lever or any other suitable operating mechanism may be used, and I desire it to be understood that changes in the form, proportion, size, and the minor details of construction within the scope of the appended claims may be resorted to without departing from the spirit or sacrificing any of the advantages of this invention.

What is claimed is—

1. In a device of the class described, the combination of a bin, a reciprocating spout flexibly connected with the bin and provided with a horizontal extension forming a guide, means for reciprocating the spout, a sieve supported within the spout in alinement with the horizontal extension and adapted to be drawn outward into the same, and means for drawing the sieve outward and for holding it in position for use, substantially as described.

2. In a device of the class described, the combination of a bin provided with a depending neck having an inwardly-extending horizontal flange, a reciprocating spout receiving the neck and provided with a horizontal support adjacent to the said flange, said spout being provided with a horizontal extension forming a guide, a sieve arranged on the support, and operating beneath the flange and adapted to be drawn outward from the same into the said extension, and means for operating the sieve and for actuating the spout, substantially as described.

3. In a device of the class described, the combination of a bin, a reciprocating spout flexibly connected with the bin and provided with a support and having an extension, a sieve arranged on the support and adapted to be drawn into the extension, an arm connected with the sieve and extending through the spout, and a catch mounted on the spout and engaging the arm, substantially as described.

4. In a device of the class described, the combination of a casing having a bin, a neck depending from the bin and provided at its top and bottom with upper and lower flanges, a spout receiving the neck and provided with an extension, a flexible sleeve secured to the upper flange of the neck and to the top of the spout, means for reciprocating the spout, a sieve arranged within the spout beneath the lower flange of said neck and adapted to be drawn into the said extension, and a locking device for holding the sieve in position for use, substantially as described.

5. In a device of the class described, the combination of a casing having a bin and provided beneath the same with projecting bars forming guides, a reciprocating spout having a sieve and flexibly connected with the bin, a sliding frame receiving the spout and provided at opposite sides with recesses arranged in pairs and located at the ends of the frame for the reception of the guides, a spring for engaging one end of the frame, and a cam-wheel for engaging the other end of the frame, substantially as described.

6. In a device of the class described, the combination of a casing having a bin and provided below the same with guides a reciprocating spout having a sieve, a sliding frame receiving the spout and constructed of a piece of metal having its terminals bent outward and spaced apart to form arms, said frame being provided at opposite sides with recesses arranged in pairs and located at the ends of the frame for the reception of the guides, a block interposed between the arms, a wheel arranged between the outer portions of the arms, a cam-wheel for engaging the said wheel to move the spout in one direction, and means for moving the spout in the opposite direction, substantially as described.

In testimony that I claim the foregoing as my own I have hereto affixed my signature in the presence of two witnesses.

PETER RAETZ.

Witnesses:
    VALENTINE HEINISH,
    PETER SMALLEN.